US008714224B2

(12) United States Patent
Giuliani et al.

(10) Patent No.: US 8,714,224 B2

(45) Date of Patent: May 6, 2014

(54) LABELLING MACHINE

(75) Inventors: Mattia Giuliani, Parma (IT); Luca De Vincenzi, Parma (IT); Cristian Guarnieri, Parma (IT)

(73) Assignee: SIDEL S.p.A. con Socio Unico (IT)

( * ) Notice: Subject to any disclaimer, the term of this patent is extended or adjusted under 35 U.S.C. 154(b) by 0 days.

(21) Appl. No.: 13/390,083

(22) PCT Filed: Aug. 12, 2009

(86) PCT No.: PCT/IT2009/000379

§ 371 (c)(1), (2), (4) Date: Apr. 20, 2012

(87) PCT Pub. No.: WO2011/018804

PCT Pub. Date: Feb. 17, 2011

(65) Prior Publication Data

US 2012/0199275 A1 Aug. 9, 2012

(51) Int. Cl.

*B65C 9/00* (2006.01)
*B29C 65/00* (2006.01)

(52) U.S. Cl.

USPC ..... 156/378; 242/416; 156/DIG. 8; 156/DIG. 44; 156/DIG. 45

(58) Field of Classification Search

CPC .. B65H 23/044; B65H 23/042; B65H 23/063; B65H 23/08; B65H 23/085
USPC ..................... 156/64, 378, DIG. 44, DIG. 45, 156/DIG. 8–DIG. 13; 242/416, 420.6, 420.4, 242/421.5, 421.7; 226/44, 118.1, 128
See application file for complete search history.

(56) References Cited

U.S. PATENT DOCUMENTS

| | | | | |
|---|---|---|---|---|
| 4,276,112 A | 6/1981 | French et al. | | |
| 4,488,925 A * | 12/1984 | Craig et al. | ................... | 156/351 |
| 6,199,614 B1 * | 3/2001 | Snyder et al. | ................. | 156/387 |
| 2004/0154749 A1 | 8/2004 | Rice | | |

FOREIGN PATENT DOCUMENTS

| | | |
|---|---|---|
| DE | 202006005557 U1 | 8/2007 |
| EP | 0934884 A1 | 8/1999 |

OTHER PUBLICATIONS

"International Application Serial No. PCT/IT2009/000379, International Search Report mailed May 27, 2010", 3 pgs.
"International Application Serial No. PCT/IT2009/000379, Written Opinion mailed May 27, 2010", 4 pgs.

* cited by examiner

*Primary Examiner* — Jeff Aftergut
*Assistant Examiner* — Carson Gross
(74) *Attorney, Agent, or Firm* — Schwegman Lundberg & Woessner, P.A.

(57) ABSTRACT

There is described a labeling machine for dispensing labels derivable from a web travelling along a feed path and applying them to articles travelling along an article path. The machine includes a web supply reel; a dispenser to unwind the web off the supply reel and for feeding the web towards an affixing station of the labeling machine, at which the labels are sequentially applied to the articles sequentially arriving thereat. The dispenser including a driver to control the advancement along the feed path of the web from which labels are derivable in accordance with the advancement along the article path of the articles to which the labels are to be applied; and a web tension control selectively actuatable to exert on the supply reel a torque directed against the unwinding sense of the web.

4 Claims, 3 Drawing Sheets

LABELLING MACHINE

PRIORITY CLAIM AND RELATED APPLICATIONS

This application is a nationalization under 35 U.S.C. 371 of PCT/IT2009/000379, filed Aug. 12, 2009, and published as WO 2011/018804 A1 on Feb. 17, 2011; which application and publication are incorporated herein by reference in their entirety.

TECHNICAL FIELD

The present invention relates to a machine and method for dispensing labels derivable from a web travelling along a feed path and applying the labels to articles—such as bottles, pots, cans, and the like—travelling along an article path.

BACKGROUND ART

Labelling machines are used to apply labels to articles of all sorts, particularly to containers. Typically used with milk jugs and juice bottles are self-stick labels, also known as pressure-sensitive labels, which commonly consist of a paper/polypropylene/adhesive laminate.

SUMMARY

The present invention relates, in particular, to a labelling machine for dispensing from a backing web labels of the pressure-sensitive type, which the following description will refer to, although this is in no way intended to limit the scope of protection as defined by the accompanying claims.

In applying self-stick or pressure-sensitive labels to containers, a backing strip, or carrier web, to which spaced apart labels are affixed, is unwound from a supply roll and pulled over a bar or blade, thereby causing each label to separate from the carrier web, which is then disposed of. Means are further provided for conveying the containers to an affixing station and for transferring each label to a container.

Typically, labelling machines of the type referred to above comprise a supply reel of a web bearing the labels and a unit for drawing the web from the supply reel and feeding it to an affixing station, wherein self-stick labels are peeled off the web and stuck to containers being carried by a carousel.

In particular, the carousel is driven by a motor so as to be able to sequentially place each individual container at an affixing station of the labelling machine.

A driving roller of the labelling machine powered by a corresponding motor draws the web off the supply reel and enables the feeding thereof to the downstream stages of application of the labels and recovery/disposal of the bare web off which the labels have been peeled.

Generally, containers conveyed to and through an affixing station by the carousel advance in an intermittent (stop-and-go) fashion, so that each container stands at the affixing station (e.g. at the blade or bar enabling the peeling of labels off the carrier web) for an amount of time sufficient to enable sticking of each label to the surface of a corresponding container. The labelled container subsequently leaves the affixing station.

Besides, even when containers are advanced continuously along a path defined, at least in the proximity of the affixing station, by the periphery of a carousel, the areas on the respective outer surfaces of two consecutive containers to which labels are to be stuck shall however be slightly spaced apart from one another.

Accordingly, the web bearing the labels has to be fed to the affixing station in a manner accounting for this discontinuity, so that the peeling off of each label is timed with the arrival of a container to be labelled at the affixing station.

The drawing/feeding unit of the labelling machine therefore generally comprises push/pull rollers capable of causing the portion of the web approaching the affixing station to momentarily stop and then resume its motion, wherein the push/pull rollers are actuated in time with the progression of areas to be labelled on the containers travelling on the carousel.

The carrier web bearing the labels is instead continuously unwound from its reel through operation of a motor driving a drawing roller of the drawing/feeding unit. As a consequence, different portions of the carrier web being driven across the drawing/feeding unit are subjected to different dynamics: while the portion of the web proximal to the affixing station is intermittently stopped and driven on, the portion of the web being unwound off the supply reel and fed into the drawing/feeding unit advances in a continuous manner, albeit generally at a variable speed.

To take these circumstances into account, the drawing/feeding unit comprises means for compensating discontinuities and non-homogeneity in the advancing speed of the carrier web, such as a chamber for accommodating a swollen length of web, or the like. Further, a plurality of idler rollers and dancer rollers are generally provided in the drawing/feeding unit in order to ensure that the carrier web is suitably tensioned at all times and under all circumstances.

However, tension exerted on the carrier web due to pull by drawing roller, especially in combination with the speed fluctuations and non-homogeneity described above, may cause undue stretching and deformation of the carrier web and labels borne by it, especially with particularly elastic, fragile and/or thin material, which may consequently break.

The occurrence of a breakage results in the labelling machine having to be stopped, so that the broken portion of the web may be disposed off and the intact carrier web may be advanced into a correct working configuration again.

Therefore, it is desirable that the breakage rate be kept at a minimum and that the complexity of the gearing elements through which the web passes along its pathway across the drawing/feeding unit is reduced, so that resuming operation in case of a breakage is as little time-consuming as possible.

A reduction in the breakage rate and in the gearing complexity also results in a reduction of both operating and production costs.

It is an object of the present invention to provide a labelling machine designed to achieve the above in a straightforward, low-cost manner.

According to the present invention, there is provided a labelling machine as claimed in claim 1 and a labelling method as claimed in claim 10.

BRIEF DESCRIPTION OF THE DRAWINGS

In the following, a preferred, non-limiting embodiment of the present invention will be described by way of example with reference to the accompanying drawings, in which.

DETAILED DESCRIPTION

Figure 1:
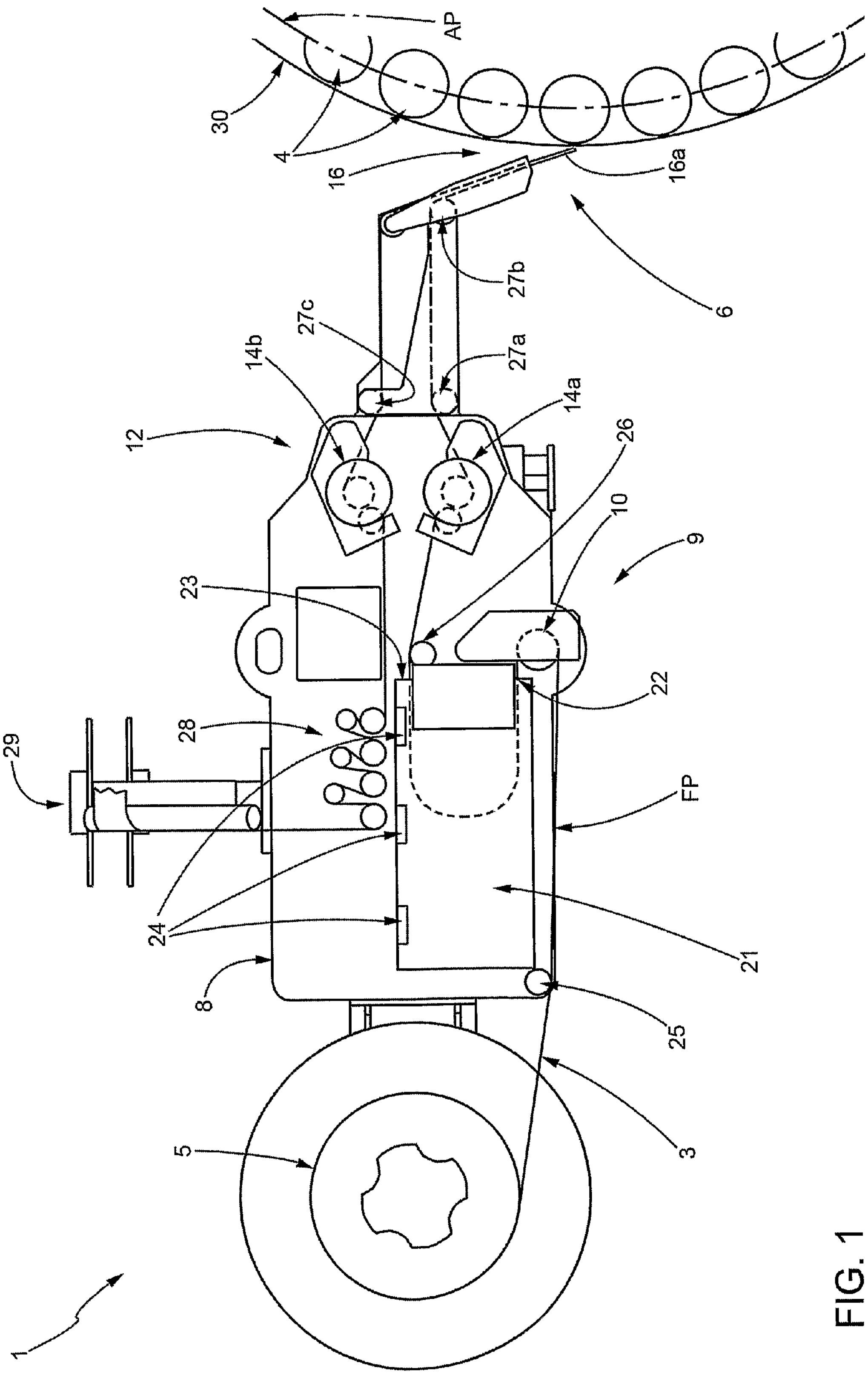
FIG. 1 shows a schematic plan view of a labelling machine according to the invention.
Figure 2:
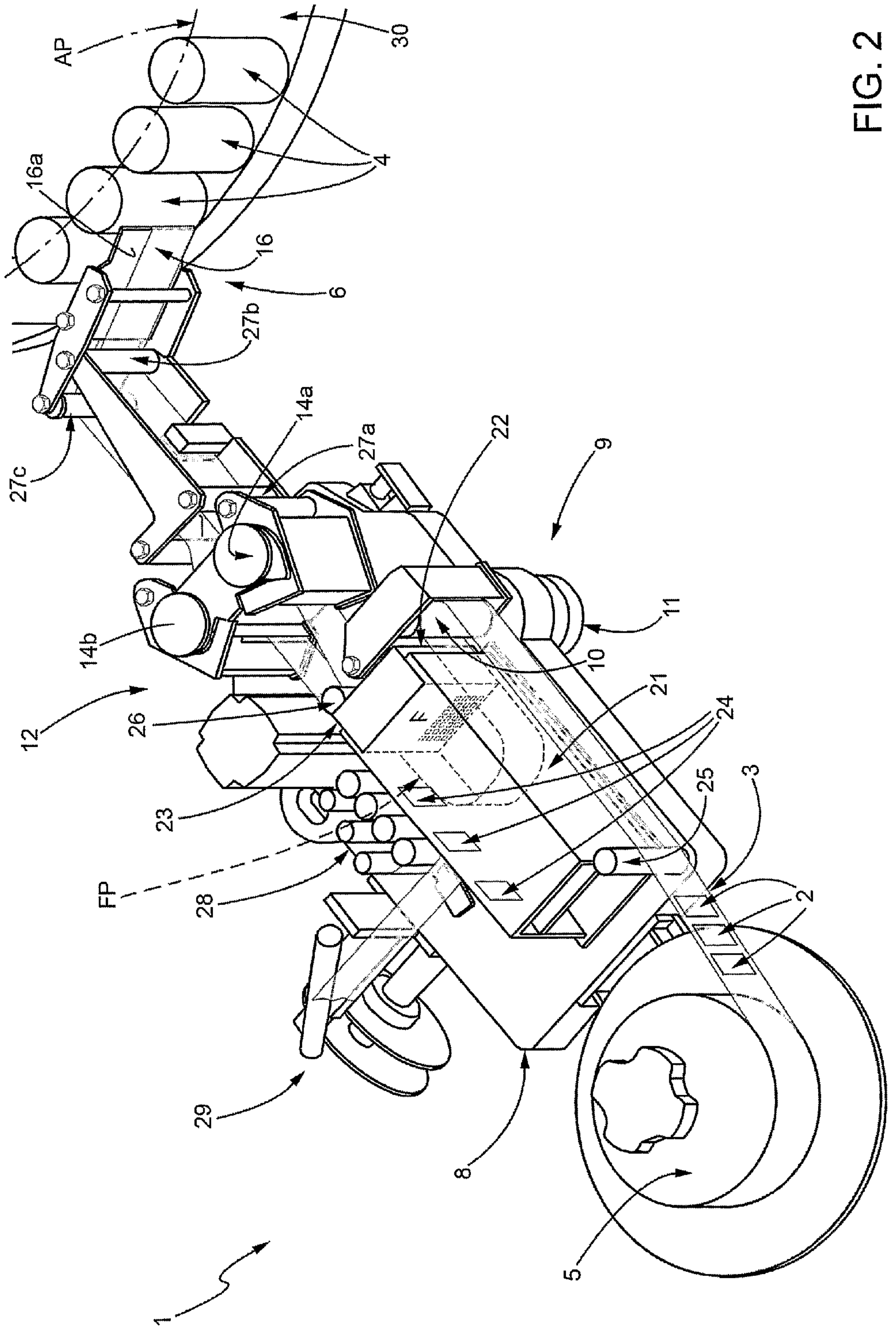
FIG. 2 shows a side perspective view from above of the labelling machine of FIG. 1.
Figure 3:
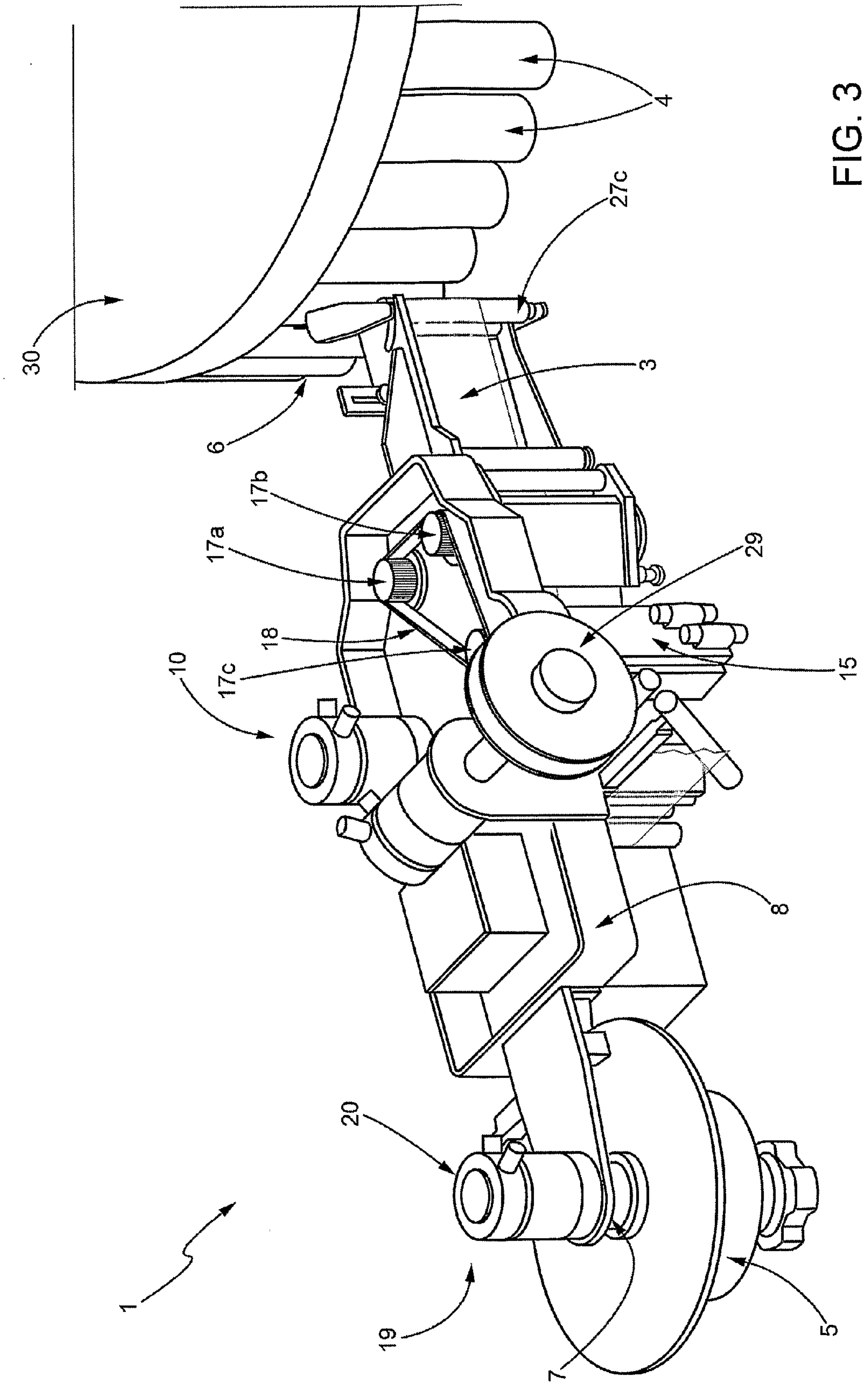
FIG. 3 shows a side perspective view from below of the labelling machine of FIGS. 1 and 2.

Number 1 in FIGS. 1, 2 and 3 indicates as a whole a labelling machine for dispensing pressure-sensitive labels 2

(shown in FIG. 2) from a backing web 3 travelling along a feed path FP and applying labels 2 to each of a plurality of articles 4 travelling along an article path AP.

Labelling machine 1 comprises a supply reel 5 off which a backing web 3 bearing pressure-sensitive labels 2, preferably spaced apart from one another, is unwound and fed along feed path FP towards an affixing station 6 of labelling machine 1.

In the case illustrated in the Figures, supply reel 5 is mounted on a support shaft 7 (see FIG. 3) which is in turn rotatably supported by a support frame 8 of labelling machine 1.

Labelling machine 1 further comprises means 9 for unwinding backing web 3 off supply reel 5. In particular, unwinding means 9 comprise (see FIGS. 2 and 3) a driving roller 10, which is positioned, with reference to a main travelling direction of backing web 3 along feed path FP, downstream of supply reel 5, and which is operatively coupled with a shaft of a variable speed motor 11. Motor 11 is lodged underneath main support frame 8 and operates to rotate driving roller 10 in an anti-clockwise direction for pulling backing web 3 off supply reel 5. The linear velocity imparted to backing web 3 by motor 11 may be controlled in a way that will be described in the following.

At affixing station 6, labels 2 are sequentially peeled off backing web 3 and applied to corresponding articles 4 sequentially arriving at affixing station 6.

To this purpose, labelling machine 1 further comprises driving means 12 for controlling the advancement along feed path FP of the labels borne by backing web 3 in accordance with the advancement along path AP of articles 4.

Driving meats 12 are positioned downstream of unwinding means 9 may alternately be actuated and de-actuated to move and terminate movement of, respectively, backing web 3 at affixing station 6.

More preferably, actuation and de-actuation of driving means 12 are controlled in such a manner that the sequential peeling of the pressure-sensitive labels 2 off backing web 3 at affixing station 6 is timed with the sequential arrival thereat of articles 4 to be labelled.

More particularly, in the embodiment illustrated in the Figures, driving means 12 comprise a pair of rollers 14*a* and 14*b*, about which backing web 3 is wound and which are mounted on respective shafts operatively coupled with a motor 15 (FIG. 3); both rollers 14*a* and 14*b* may be rotated by motor 15 in an anti-clockwise direction for advancing the length of web 3 bearing the next label 2 to be applied towards a dispensing device 16 at affixing station 6. De-actuation of rollers 14*a* and 14*b* prevents the length of web 3 bearing the next label 2 to be applied from advancing any further along feed path FP.

As shown in FIG. 3, motor 15 has an output shaft coupled with a driving pulley 17*c*, which is in turn coupled, by means of a timing belt transmission 18, with a pair of driven pulleys 17*a* and 17*b* angularly fitted to respective rollers 14*a* and 14*b*.

In practice, during operation of labelling machine 1, rollers 14*a* and 14*b* alternately start and stop the movement of backing web 3 along feed path FP so as to create intermittent actuation periods. Each actuation period starts the moment rollers 14*a* and 14*b* begin rotating and ends when rollers 14*a* and 14*b* stop rotating.

Ideally, during each actuation period of driving means 12, a predetermined length of backing web 3 bearing the next label 2 to be applied is pulled over a peeler blade 16*a* of dispensing device 16, so as to accurately and reliably place it in a label stop position adjacent to a peeling edge of the blade 16*a*.

Advantageously, labelling machine 1 further comprises web tension control means 19 (FIG. 3) selectively actuatable to exert on supply reel 5 a torque directed against the unwinding sense of backing web 3. In particular, web tension control means 19 comprise a variable speed motor 20 operatively coupled with support shaft 7. Motor 20 may conveniently b lodged underneath supply reel 5, and operates to rotate supply reel 5 in a clockwise direction, i.e. in a direction opposed to the unwinding of backing web 3.

Labelling machine 1 also comprises an expansion chamber 21 through which backing web 3 travels along a portion of feed path FP comprised between unwinding means 9 and driving means 12. More particularly, expansion chamber 21 comprises a web inlet 22 through which backing web 3 may be fed into expansion chamber 21 and a web outlet 23 through which backing web 3 may be fed out of expansion chamber 21 and on to the downstream stages of labelling machine 1, and more particularly to driving means 12.

Expansion chamber 21 is designed so as to allow backing web 3 to swell as a result of the speed differential which may occur, during operation of the labelling machine, between unwinding means 9 and driving means 12. In other words, since the advancement of backing web 3 is alternately started and interrupted at affixing station 6, yet means 9 for unwinding backing web 3 off supply reel 5 are continuously actuated, a portion of backing web 3 upstream of driving means 12 shall keep advancing along feed path FP whilst a portion of backing web 3 downstream of driving means 12 is stopped. This causes for a length of backing web 3 to accumulate and swell upstream of driving means 12, thereby compensating for the speed differential described above. Expansion chamber 21 is designed so as to accommodate the accumulating and swelling length of web thereby preventing any interaction thereof with other moving parts of the machine.

Between web inlet 22 and web outlet 23 there is provided a fan F adapted to direct a flow of air towards the accumulating length of backing web 3 so as to favour its swelling, so that risk of backing web 3 entangling is conveniently reduced.

Advantageously, expansion chamber 21 further comprises a plurality of sensing means 24, such as optical sensors, for sensing the swelling length of backing web 3 and generating, accordingly, a swelling signal. More particularly, a series of optical sensors may be provided along one wall of expansion chamber 21, so that the generation (or lack of generation) of a swelling signal from each of them may be elaborated into information relative to the position of backing web 3 within expansion chamber 21.

In other words, generation of a swelling signal only by a first optical sensor placed adjacent to web inlet 22 shall indicate a minimum swelling state of backing web 3. On the other hand, generation of a swelling signal also by all other optical sensors placed along the wall of expansion chamber 22 shall indicate a maximum swelling state of backing web 3, which has come to occupy the greater part of the volume available for its accumulation.

Similarly, generation of a swelling signal by a more than one optical sensor shall correspond to an intermediate swelling state of backing web 3 within expansion chamber 21.

The swelling signal generated by the optical sensors may thus be elaborated into a Web swelling state signal. Advantageously, the angular velocity of unwinding means 9 may be controlled as a function of the web swelling state signal, thereby varying the linear velocity of backing web 3 at unwinding means 9.

The length of backing web 3 comprised between supply reel 5 and unwinding means 9 is subjected at once to both the torque exerted by unwinding means 9 and the torque exerted by web tension control means 19. These two torques being of opposite sign, a variation in the angular velocity of unwinding means 9 needs to be compensated by a corresponding variation in the torque exerted by control means 19 upon supply reel 5, so as to prevent the occurrence of undesired tension changes in the length of backing web 3 being fed into labelling machine 1. In particular, an abrupt increase in the web tension may cause a stretching not compatible with its elastic deformation properties, unless this increase is conveniently compensated upstream.

Web tension control means 19 are therefore configured to respond to a variation in the linear velocity of backing web 3 at unwinding means 9 with a corresponding variation in the torque exerted on supply reel 5, such as to maintain the web tension within a predetermined range.

More particularly, during operation of labelling machine 1, motor 20 exerts upon supply reel 5 a torque of magnitude lesser than the magnitude of the torque exerted by driving roller 10 on backing web 3, such that the resultant of the two opposing forces simultaneously pulling backing web 3 is always directed in the unwinding sense of backing web 3, and that the linear tension thus induced in the web is compatible with its elastic deformation properties. In other words, motor 20 is configured to exert upon supply reel 5 a torque such that the resultant of pulling forces applied to backing web 3 shall not cause breaks or plastic deformation thereof.

Moreover, motor 20 is configured to vary the magnitude of the torque it exerts upon supply reel 5 when driving roller 10 is accelerated or decelerated, thereby increasing or decreasing the torque exerted upon backing web 3 being fed into labelling machine 1, so that the resultant of pulling forces applied to backing web 3 is maintained within the predetermined range mentioned above also during all start-up and shut-down phases, as well as when the linear velocity of backing web 3 must be varied to account for the swelling within expansion chamber 21 or for any equivalent operation requirement.

The predetermined tension range mentioned above shall depend on characteristics of backing web 3 being used, such as mechanical properties of the material, geometry (height and thickness), etc. and may, accordingly, be pre-set prior to initiating operation of labelling machine 1.

During normal operation labelling machine 1, motor 20 shall constantly output an error signal, since its shaft 7 shall be rotating in a sense opposite to the one corresponding to the torque exerted by motor 20.

Should backing web 3 break between supply reel 5 and unwinding means 9, the resultant of pulling forces applied on supply reel 5 would be due solely to the torque exerted by web tension control means 19, therefore supply reel 5 would invert its sense of rotation and motor 20 would no longer output an error signal. Similarly, when all the web 3 of supply reel 5 is exhausted, supply reel 5 shall be subjected solely to the torque exerted by web tension control means 19, therefore supply reel 5 shall invert its sense of rotation and motor 20 shall no longer output an error signal.

In this respect, detecting a change in the error signal outputted by motor 20 is equivalent to detecting a breakage in the length of backing web 3 in the portion of feed path FP comprised between supply reel 5 and unwinding means 9 or the exhaustion of the web 3 of supply reel 5. Along the whole of feed path FP, backing web 3 bearing the pressure-sensitive labels 2 is unwound off supply reel 5 to pass around a first idler roller 25 and to extend toward driving roller 10. Backing web 3 is thereby pulled and fed into expansion chamber 20 through web inlet 21.

Subsequently, backing web 3 bends whilst travelling across expansion chamber 21 and out of it through outlet 23, then passes around a second idler roller 26.

Continuing downstream, backing web 3 is pulled by roller 14*a* and fed on around another two consecutive idler rollers 27*a* and 27*b* and then off to peeling blade 16*a* of dispensing device 16.

Once past peeling blade 16*a*, the bare web off which labels 2 have been peeled continues along feed path FP around yet another idler roller 27*c* and to roller 14*b*.

Downstream of roller 14*b*, the bare web 3 passes around another group 28 of idler rollers, optionally in conjunction with a dancer arm (not shown), and finally fed to a waste means 29 for accumulating the bare web 3 for subsequent disposal.

During operation of labelling machine 1, articles 4 to be labelled are advanced, by a carousel 30 or conveyor belt, towards affixing station 6.

Unwinding means 9 are continuously operated, at a variable speed which may be controlled as a function of the web swelling state in expansion chamber 21, to pull backing web 3 off supply reel 5.

Driving means 12 are alternately actuated and de-actuated so as to bring the next label to be applied at the label stop position adjacent to peeling blade 16*a* of dispensing device 16 in time with the sequential arrival thereat of the next article 4 to be labelled.

The label 2 is thereby peeled off backing web 3 and applied to the corresponding article 4, which then advances along path AP away from affixing station 6.

The bare web 3 off which the label 2 has been peeled off is advanced along feed path FP towards the waste means 29.

Throughout operation of labelling machine 1, control means 19 may be actuated to exert on supply reel 5 a torque in the sense opposite to web unwinding, so as to control the tension in backing web 3, which is exposed to the speed fluctuations and non-homogeneity described above. To this purpose, motor 20 of control means 19 responds to a variation in the linear velocity of the backing web 3 at the unwinding means 9—or, in other words, to a variation in the torque exerted by driving roller 10 (e.g. by motor 11) which results in a greater/lesser pulling force applied on backing web 3 in the unwinding direction—with a corresponding variation in the torque exerted on supply reel 5, such as to maintain the web tension within the predetermined range compatible with its elastic properties.

Thus, the occurrence of breakages of backing web 3 caused by unduly stretching thereof may be virtually eliminated.

Further, such goal may advantageously be achieved without mechanical elements such as springs, dancer arms and the like, which generally complicate the feeding of the web 3 into labelling machine 1 when supply reel 5 is changed or when operation is resumed following a breakage.

Clearly; changes may be made to labelling machine 1 and labelling method as described and illustrated herein without, however, departing from the scope of protection as defined in the accompanying claims.

In particular, the present invention is also applicable to other types of labels, such as the ones which are directly cut from a web unwound off a supply reel.

The invention claimed is:

1. A labelling machine to dispense and apply labels from a web to articles travelling along an article path, said labelling machine comprising:

a web supply reel;

a dispenser to unwind the web from the supply reel and direct the web along a feed path to an affixing station that sequentially applies the labels to the articles as each article travels along the article path;

a driver to control the advancement of the web along the feed path in accordance with the advancement of the articles along the article path such that individual labels are applied to each one of the articles; and a web tension control element which is selectively actuated to exert on said supply reel a torque directed against the unwinding sense of the web, said web tension control element being configured to respond to a variation in the linear velocity of said web at said dispenser with a corresponding variation in the torque exerted on said supply reel such as to maintain the web tension within a predetermined range.

2. The labelling machine of claim 1, wherein said web tension control element includes a first motor operatively coupled with a shaft upon which said supply reel is mounted.

3. The labelling machine of claim 1, wherein said dispenser comprises: a driving roller positioned downstream of said supply reel, the roller being continuously driven by a second motor in the unwinding sense of said web.

4. The labelling machine of claim 1, wherein said driver is arranged downstream of said dispenser; wherein the driver is actuatable and de-actuatable to move the web, and the dispenser is actuatable and de-actuatable to terminate movement of the web at the affixing station.

* * * * *